Figure 1:
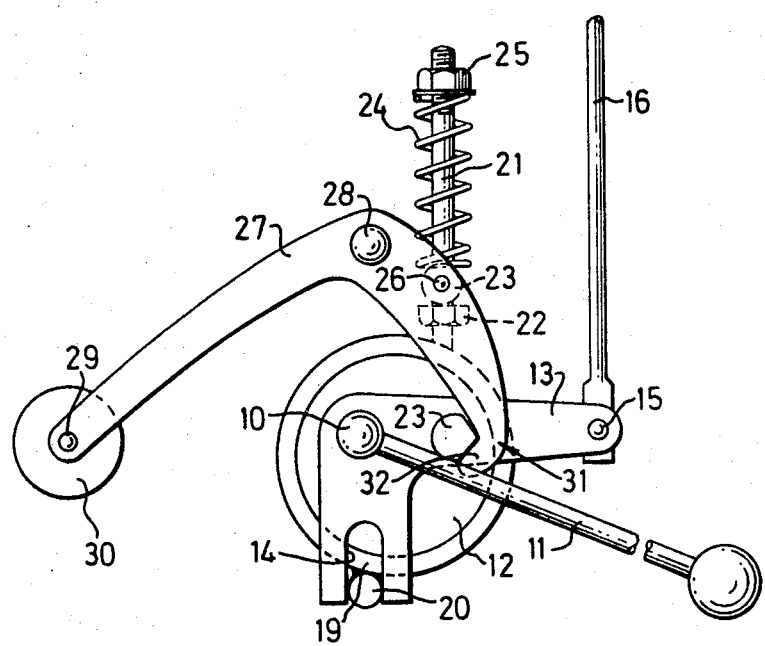

United States Patent
Hall et al.

[11] 3,721,319
[45] March 20, 1973

[54] HOISTS

[75] Inventors: Richard John Hall, Bexley Heath; Alan John Shalders, Tolworth, both of England

[73] Assignee: A.C.E. Machinery Limited, London, England

[22] Filed: Nov. 15, 1971

[21] Appl. No.: 198,690

[52] U.S. Cl. ..................................... 187/61, 187/57
[51] Int. Cl. ............................................. B66b 13/16
[58] Field of Search.......... 187/47, 49, 56, 57, 59, 60, 187/61

[56] References Cited

UNITED STATES PATENTS 2,067,242  1/1937  Norton ................................. 187/57

FOREIGN PATENTS OR APPLICATIONS 1,213,689  11/1970  Great Britain .......................... 187/61

Primary Examiner—Evon C. Blunk
Assistant Examiner—Merle F. Maffei
Attorney—Norris & Bateman

[57] ABSTRACT

A gate locking mechanism for the cage of a hoist having a plurality of landings, said mechanism comprising a shaft carrying an operating handle and having a lever pivotally mounted thereon, a cam eccentrically mounted on the shaft, a locking catch adapted to engage with a gate for the cage and connected to said lever, and means for preventing operation of the catch except when the cage is opposite one of the landings, said means comprising a spring-loaded follower adapted to co-operate with a locking peg provided provided on the lever, the arrangement being such that operation of the handle is effective to pivot the cam and, when the cage is not opposite a landing, to pivot the follower until it engages with the locking peg preventing further movement and ensuring that the gate is still engaged by the locking catch, and, when the cage is opposite a landing, to force the follower into engagement with a ramp provided on the hoist structure whereby the follower is held clear of the locking peg and further movement of the mechanism is effective to pivot the lever and hence move the locking catch clear of the gate.

6 Claims, 2 Drawing Figures

HOISTS

This invention relates to hoists for use on building sites and is particularly concerned with a gate locking mechanism for cages of such hoists.

Hoist cages are known which have gate locks in which a locking member for the gate is under the control of a follower on the cage and in which ramps are provided at the various landings of the hoist, the arrangement being such that the gate can only be opened when the cage is at a landing. Such gate lock is described and claimed in our prior U.S. Pat. No. 1,047,977.

The present invention aims to provide an improved gate lock having a number of advantages over the gate lock described and claimed in the prior Patent.

According to the invention, there is provided a gate locking mechanism for the cage of a hoist having a plurality of landings, said mechanism comprising a shaft carrying an operating handle and having a lever pivotally mounted thereon, a cam eccentrically mounted on the shaft, a locking catch adapted to engage with a gate for the cage and connected to said lever, and means for preventing operation of the catch except when the cage is opposite one of the landings, said means comprising a spring-loaded follower adapted to co-operate with a locking peg provided on the lever, the arrangement being such that operation of the handle is effective to pivot the cam and, when the cage is not opposite a landing, to pivot the follower until it engages with the locking peg preventing further movement and ensuring that the gate is still engaged by the locking catch and, when the cage is opposite a landing, to force the follower into engagement with a ramp provided on the hoist structure whereby the follower is held clear of the locking peg and further movement of the mechanism is effective to pivot the lever and hence move the locking catch clear of the gate.

Figure 2:
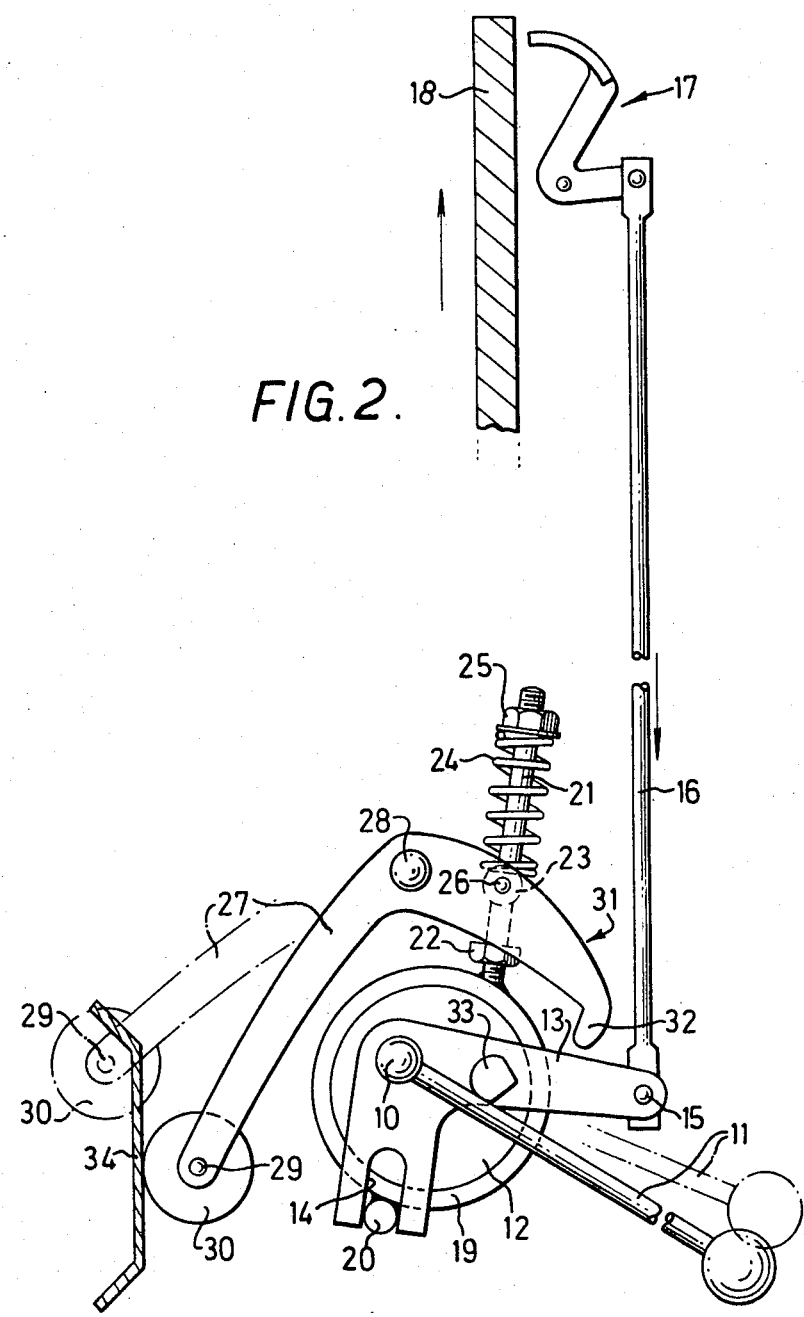

The invention will be described further, by way of example with reference to the accompanying drawings, in which:

FIG. 1 is a diagrammatic elevation of a gate locking mechanism of the invention with the gate in its closed position; and FIG. 2 is a view similar to FIG. 1 but with the gate in its open position.

The drawings show a gate locking mechanism according to the invention which comprises a shaft 10 pivotally mounted on a cage (not shown) for a hoist and carries an operating handle 11 at each end, one handle 11 being located inside the cage and the other handle 11 outside the cage. Thus the mechanism can be operated at each landing either from the inside or on the outside of the cage.

A cam 12 is eccentrically mounted on the shaft 10 and a pair of levers 13 is pivotally mounted on the shaft on either side of the cam 12. Each lever 13 takes the form of a bell-crank lever pivoted at the junction between the arms of the bell-crank. One arm of each lever 13 is provided at its end with a slot 14 and the other arms of the levers are connected together by a shaft or rod 15. The shaft or rod 15 carries one end of a connecting link 16 the other end of which is connected to a pivoted locking catch 17 which is arranged to engage with a rise and fall gate 18 of the cage. The connecting link 16 is preferably provided with adjustment means (not shown) for adjusting the length thereof.

A cam ring 19 is provided on the cam 12 and carries a pair of drive pegs 20 each of which is received in a respective one of the slots 14 in each lever 13. The cam ring 19 is also provided with a rod 21 extending outwardly in a substantially radial direction. The rod 21 is screw-threaded over at least part of its length and carries a first nut 22, a bush 23, a coil spring 24 and a second nut 25. The second nut 25 is adjusted so that the bush 23 is forced against the first nut 22 by the spring 24 which bears at one end against the bush 23 and at the other end against the second nut 25. The ends of the bush 23 are received in bores 26 provided in a follower in the form of a pair of bell crank levers 27 near to but spaced from the junction between the arms thereof. These levers 27 are pivotally mounted on a shaft 28 mounted on the cage at a point spaced from the bush bores 26 and the ends of the levers 27 remote from the bush 23 are connected by a shaft 29 carrying a probe wheel 30. The other end of the levers 27 are provided with latch means 31 in the form of a pair of catches 32 which are adapted for engagement with a pair of locking pegs 33 provided on the levers 13.

The mechanism is so arranged that the locking catch 17 can only be moved clear of the gate 18 to permit the latter to be opened when the cage on which the mechanism is provided is opposite one of the landings of the hoist as will be apparent from the following description of the operation of the gate lock mechanism according to this invention.

When it is desired to open the cage gate 18, the locking mechanism must first be released and this is done by operating one or other of the handles 11. This causes the shaft 10 and hence the cam 12 to rotate in a clockwise direction in the drawings. The cam ring 19 moves with the cam 12 and the cam ring rod 21 is moved in a clockwise direction. The bush 23 which is urged against the first nut 22 by the coil spring 24 causes the second pair of bell crank levers 27 to pivot about the fixed shafts 28 and the probe wheel 30 is forced outwardly away from the cage until the position illustrated in FIG. 1 is reached. Further operation of the mechanism is dependent on whether or not the cage is opposite a landing of the hoist.

If the cage is not opposite a landing, the probe wheel 30 can move outwardly from the cage and the levers 27 carrying the probe wheel 30 are pivoted into a position in which the catches 32 engage with the locking peg 33 (see FIG. 1). Further rotation of the cam 12 is prevented and thus the gate locking catch 17 remains in position preventing the gate 18 from being opened.

If, however, the cage is opposite a landing, the probe wheel 30 is forced against a ramp 34 (see FIG. 2) provided on the hoist structure thus pivoting the levers 27 carrying the probe wheel 30 anti-clockwise until they reach the position shown in FIG. 2. The pair of catches 32 on said levers 27 cannot therefore be moved into the path of the locking pegs 33 on the levers 13 and thus the cam 12 is free to rotate further. Further pivoting of the cam ring 19 via the levers 13 and pegs 20 causes the cam ring 19 to pivot further, the bush 23, which is restrained by the probe wheel carrying levers 27, moving up the cam ring rod 21 against the action of the spring 24. At the same time the pegs 20 on the cam ring cause the levers 13 on the main operating shaft 10 to pivot and act on the connecting link 16 which in turn moves the locking catch 17 away from the gate 18 so that the gate 18 can be opened.

Some movement of the locking catch 17 takes place even when the cage is not opposite a landing but this movement is not enough to free the gate 18 before the cam 12 is arrested.

It will be appreciated that a ramp 34 for engagement by the probe wheel 30 is provided at each landing of the hoist.

By providing a handle 11 at each end of the operating shaft 10 the gate locking mechanism can be operated either from the inside or the outside of the cage which is a considerable advantage over prior mechanisms which could only be operated from inside the cage.

Further, the cam and locking pegs of the present invention obviate the need for careful adjustment of levers thus facilitating manufacture and assembly of the locking mechanism according to this invention. The only adjustments required are: (1) the tension of the spring 24 on the cam ring rod 21 to suit particular requirements and (2) the length of the connecting link 16 which depends on the relative locations of the operating shaft 10 and locking catch 17 and on the size of the gate 18.

Electric interlock means (not shown) are preferably provided whereby the cage cannot be moved until the gate 18 is closed and the locking catch 17 engaged to prevent opening of the gate 18 between landings.

Other embodiments and modifications of the gate lock mechanism are envisaged without departing from the scope of the following claims.

We claim:

1. A gate locking mechanism for the cage of a hoist having a plurality of landings, said mechanism comprising a shaft carrying an operating handle and having a lever pivotally mounted thereon, a cam eccentrically mounted on the shaft, a locking catch adapted to engage with a gate for the cage and connected to said lever, and means for preventing operation of the catch except when the cage is opposite one of the landings, said means comprising a spring-loaded follower adapted to co-operate with a locking peg provided on the lever, the arrangement being such that operation of the handle is effective to pivot the cam and, when the cage is not opposite a landing, to pivot the follower until it engages with the locking peg preventing further movement and ensuring that the gate is still engaged by the locking catch, and, when the cage is opposite a landing, to force the follower into engagement with a ramp provided on the hoist structure whereby the follower is held clear of the locking peg and further movement of the mechanism is effective to pivot the lever and hence move the locking catch clear of the gate.

2. A mechanism as claimed in claim 1, wherein a further similar lever is provided so that one lever is disposed on each side of the cam, both levers having a bell-crank shape and being pivotally mounted on the shaft at the junction between the arms of the bell-crank.

3. A mechanism as claimed in claim 2, wherein one arm of each lever is provided at its end with a slot which engages a drive peg of the cam and the other arms of the levers are connected together by a shaft or rod which carries one end of a connecting link, the other end of the link being connected to the locking catch.

4. A mechanism as claimed in claim 3, wherein the cam includes a cam ring which carries the drive peg and which is also provided with a rod extending generally radially outwardly thereof, the rod being surrounded by a coil spring which acts on a bush pivotally mounted on the follower to spring-load the latter.

5. A mechanism as claimed in claim 4, wherein the follower is in the form of a pair of bell-crank levers pivotally mounted on a shaft at or near the junction between their arms on the cage, the bush being spaced from such shaft.

6. A mechanism as claimed in claim 5, wherein the ends of the bell-crank levers of the follower remote from the bush are connected by a shaft carrying a probe wheel arranged to engage the ramp, and the other ends of the follower levers are provided with latch means in the form of a pair of catches which are adapted for engagement with the locking peg and a similar locking peg provided on the first pair of levers.

* * * * *